(12) United States Patent
Nguyen et al.

(10) Patent No.: US 8,577,845 B2
(45) Date of Patent: Nov. 5, 2013

(54) REMOTE, GRANULAR RESTORE FROM FULL VIRTUAL MACHINE BACKUP

(75) Inventors: Sinh D. Nguyen, Eden Prairie, MN (US); Timothy M. Naftel, Longmont, CO (US)

(73) Assignee: Symantec Operating Corporation, Mountain View, CA (US)

( * ) Notice: Subject to any disclaimer, the term of this patent is extended or adjusted under 35 U.S.C. 154(b) by 513 days.

(21) Appl. No.: 12/138,897

(22) Filed: Jun. 13, 2008

(65) Prior Publication Data

US 2009/0313447 A1     Dec. 17, 2009

(51) Int. Cl.
G06F 7/00       (2006.01)
G06F 17/00      (2006.01)

(52) U.S. Cl.
USPC .......................... 707/654; 707/682; 711/162

(58) Field of Classification Search
USPC ................................................. 707/654, 682
See application file for complete search history.

(56) References Cited

U.S. PATENT DOCUMENTS

| | | | |
|---|---|---|---|
| 4,912,628 A | 3/1990 | Briggs | |
| 4,969,092 A | 11/1990 | Shorter | |
| 5,257,386 A | 10/1993 | Saito | |
| 5,408,617 A | 4/1995 | Yoshida | |
| 5,621,912 A | 4/1997 | Borruso et al. | |
| 5,852,724 A | 12/1998 | Glenn, II et al. | |
| 5,872,931 A | 2/1999 | Chivaluri | |
| 5,944,782 A | 8/1999 | Noble et al. | |
| 6,003,065 A | 12/1999 | Yan et al. | |
| 6,029,166 A | 2/2000 | Mutalik et al. | |
| 6,075,938 A | 6/2000 | Bugnion et al. | |
| 6,151,618 A | 11/2000 | Wahbe et al. | |
| 6,230,246 B1 | 5/2001 | Lee et al. | |
| 6,298,390 B1 | 10/2001 | Matena et al. | |
| 6,298,428 B1 | 10/2001 | Munroe et al. | |
| 6,324,627 B1 | 11/2001 | Kricheff et al. | |
| 6,341,329 B1 | 1/2002 | LeCrone et al. | |
| 6,363,462 B1 | 3/2002 | Bergsten | |
| 6,370,646 B1 | 4/2002 | Goodman et al. | |
| 6,397,242 B1 | 5/2002 | Devine et al. | |
| 6,421,739 B1 | 7/2002 | Holiday | |
| 6,438,642 B1 | 8/2002 | Shaath | |
| 6,487,561 B1 * | 11/2002 | Ofek et al. ............................ | 1/1 |
| 6,493,811 B1 | 12/2002 | Blades et al. | |
| 6,496,847 B1 | 12/2002 | Bugnion et al. | |
| 6,542,909 B1 | 4/2003 | Tamer et al. | |
| 6,694,346 B1 | 2/2004 | Aman et al. | |
| 6,718,538 B1 | 4/2004 | Mathiske | |

(Continued)

OTHER PUBLICATIONS

T-Shma et al., "Virtual Machine Time Travel Using Continuous Data Protection and Checkpointing". IBM, Mar. 24-26.*

(Continued)

*Primary Examiner* — Daniel Kuddus
(74) *Attorney, Agent, or Firm* — Lawrence J. Merkel; Meyertons, Hood, Kivlin, Kowert & Goetzel, P.C.

(57) ABSTRACT

In one embodiment, a backup application transmits a remote request to a virtual machine that includes an application to be backed up. The request solicits metadata from the application that describes a structure of the data stored by the application on the virtual storage devices of the virtual machine. Using the metadata, the backup application may identify objects within the virtual machine. Accordingly, a granular restore of data to the virtual machine may be possible without installing backup software within the virtual machine.

16 Claims, 5 Drawing Sheets

(56) References Cited

U.S. PATENT DOCUMENTS

| | | |
|---|---|---|
| 6,757,778 B1 | 6/2004 | van Rietschote |
| 6,763,440 B1 | 7/2004 | Traversat et al. |
| 6,789,103 B1 | 9/2004 | Kim et al. |
| 6,802,062 B1 | 10/2004 | Oyamada et al. |
| 6,804,755 B2* | 10/2004 | Selkirk et al. ............ 711/165 |
| 6,973,556 B2* | 12/2005 | Milligan et al. ........... 711/202 |
| 7,010,528 B2* | 3/2006 | Curran et al. ................... 1/1 |
| 7,093,086 B1 | 8/2006 | van Rietschote |
| 7,213,246 B1 | 5/2007 | van Rietschote et al. |
| 7,356,679 B1* | 4/2008 | Le et al. ...................... 713/1 |
| 7,707,185 B1* | 4/2010 | Czezatke et al. .......... 707/649 |
| 7,743,033 B2* | 6/2010 | Patel et al. ................. 707/652 |
| 2001/0016879 A1 | 8/2001 | Sekiguchi et al. |
| 2002/0001395 A1* | 1/2002 | Davis et al. ................ 382/100 |
| 2002/0049869 A1 | 4/2002 | Ohmura et al. |
| 2002/0099753 A1 | 7/2002 | Hardin et al. |
| 2002/0129078 A1 | 9/2002 | Plaxton et al. |
| 2003/0028861 A1 | 2/2003 | Wallman et al. |
| 2003/0033431 A1 | 2/2003 | Shinomiya |
| 2003/0115218 A1* | 6/2003 | Bobbitt et al. ............. 707/200 |
| 2004/0010787 A1* | 1/2004 | Traut et al. .................... 718/1 |
| 2005/0114614 A1* | 5/2005 | Anderson et al. .......... 711/162 |
| 2006/0010433 A1* | 1/2006 | Neil .............................. 717/138 |
| 2006/0047584 A1* | 3/2006 | Vaschillo et al. ............ 705/27 |
| 2007/0271428 A1* | 11/2007 | Atluri .......................... 711/162 |

OTHER PUBLICATIONS

Pfoser et al. "Metadata Modeling in a Global Computing Environment", GIS 2002.*
Ta-Shma et al., "Virtual Machine Time Travel Using Continuous Data Protection and Checkpointing"; ACM, Jan. 2008.*
Pfesor et al., "Metadata Modeling in a Global Computing Environment"; GIS 2002.*
U.S. Appl. No. 10/109,406, filed Mar. 28, 2002.

* cited by examiner

REMOTE, GRANULAR RESTORE FROM FULL VIRTUAL MACHINE BACKUP

BACKGROUND

1. Field of the Invention

This invention is related to virtual machines and, more particularly, to the backup and restore of virtual machines.

2. Description of the Related Art

Virtual machines have a variety of uses in computer systems. For example, virtual machines are used to provide several users with concurrent access to a single physical computer system. Each user executes applications in a different virtual machine, and the virtual machines are scheduled for execution on the computer system hardware. The processing power of the computer system can be more effectively utilized by providing multiple virtual machines on the computer system. Additionally, user's activities are protected from the operation of other user's programs via the division into virtual machines. Virtual machines can also be used during software development to test the software on various hardware configurations (e.g. each hardware configuration is represented by a differently-configured virtual machine). Virtual machines can be used to consolidate tasks that were previously running on separate computer systems by assigning each task to a virtual machine and running the virtual machines on fewer computer systems. There are many other uses for virtual machines as well.

Because of their usefulness, virtual machines are being deployed more frequently across the computing spectrum. Additionally, the continued increase in processing power that is available on a single computer system (and especially on larger server systems) makes the overhead of the virtual machine less noticeable to the user, and permits more virtual machines to be executed on a single computer system. Cost savings may be realized by requiring fewer physical computer systems to provide the needed processing power for a given set of users.

Computer systems, and their components, are subject to various failures which may result in the loss of data. For example, a storage device used in or by the computer system may experience a failure (e.g. mechanical, electrical, magnetic, etc.) which may make any data stored on that storage device unreadable. Erroneous software or hardware operation may corrupt the data stored on a storage device, destroying the data stored on an otherwise properly functioning storage device. Any component in the storage chain between (and including) the storage device and the computer system may experience failure (e.g. the storage device, connectors (e.g. cables) between the storage device and other circuitry, the network between the storage device and the accessing computer system (in some cases), etc.).

To mitigate the risk of losing data, computer system users typically make backup copies of data stored on various storage devices. In the case of virtual machines, it is generally possible to make a backup copy of the entire virtual machine state. To restore data in the event of a data loss, the entire virtual machine state is restored and the virtual machine is restarted. There is no granularity in the data that is to be restored. In some cases, users can install backup software inside their virtual machines to provide for granularity in the restore, but users are often reluctant to install the software.

SUMMARY

In one embodiment, a backup application transmits a remote request to a virtual machine that includes an application to be backed up. The request solicits metadata from the application that describes a structure of the data stored by the application on the virtual storage devices of the virtual machine. Using the metadata, the backup application may identify objects within the virtual machine (e.g. individual files, individual messages, database records or tables, etc.). Accordingly, a granular restore of data to the virtual machine may be possible without installing backup software within the virtual machine.

BRIEF DESCRIPTION OF THE DRAWINGS

The following detailed description makes reference to the accompanying drawings, which are now briefly described.

Figure 1:
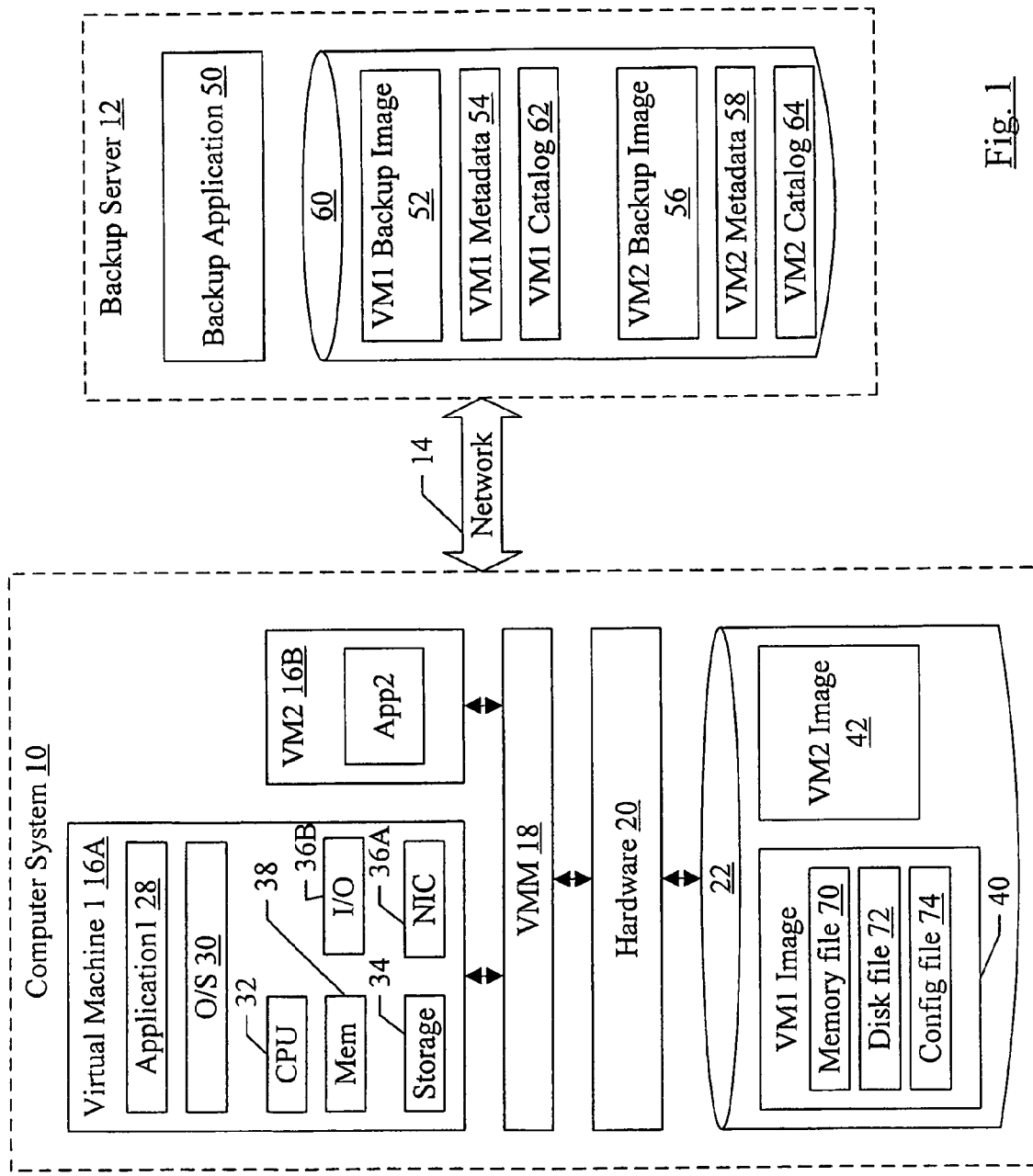
FIG. 1 is a block diagram of a computer system that executes virtual machines and a backup server that backs up the virtual machines.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a system including a computer system 10 and a backup server 12 coupled via a network 14. Thus, in the illustrated embodiment, the computer system 10 and the backup server 12 are separate computer systems. In other embodiments, it is contemplated that the backup server 12 may also be executed in a virtual machine on the computer system 10. That is, the backup server's virtual machine would be separate from the virtual machines that encapsulate the applications for which the backup server 12 performs backup.

The computer system 10 includes one or more virtual machines (e.g. virtual machines 16A-16B as illustrated in FIG. 1). The virtual machines are controlled by a virtual machine monitor (VMM) 18. The virtual machines 16A-16B and the VMM 18 may comprise software and/or data structures. The software may be executed on the underlying hardware in the computer system 10 (e.g. the hardware 20). The hardware may include any desired circuitry. For example, the hardware may include one or more processors, or central processing units (CPUs), storage, and input/output (I/O) circuitry. In the embodiment of FIG. 1, the computer system 10 includes a storage device 22. The storage device 22 is generally part of the hardware 20, but is shown separately in FIG. 1 to illustrate certain data stored thereon.

As shown in FIG. 1, each application executing on the computer system 10 executes within a virtual machine 16A-16B. Generally, a virtual machine comprises any combination of software, one or more data structures in memory, and/or one or more files stored on a storage device (such as the storage device 22). Under the control of the VMM 18, the virtual machine mimics the hardware used during execution of a given application that is encapsulated by the virtual machine. For example, in the virtual machine 16A, an application 28 is shown. The application 28 is designed to execute on the operating system (O/S) 30. Both the application 28 and the O/S 30 are coded with instructions executed by the virtual CPU 32. Additionally, the application 28 and/or the O/S 30 may make use of virtual memory 38, one or more virtual storage devices 34, and virtual input/output (I/O) such as devices 36A-36B. The virtual storage may mimic any type of storage, such as disk storage, tape storage, etc. The disk storage may be any type of disk (e.g. fixed disk, removable disk, compact disc read-only memory (CD-ROM), rewriteable or read/write CD, digital versatile disk (DVD) ROM, etc.). Each virtual disk storage in the virtual machine may be mapped to a file on a storage device such as the storage device 22. Alternatively, each virtual disk storage may be mapped directly to a physical storage device, or a combination of direct mappings and file mappings may be used. The virtual I/O devices may mimic any type of I/O devices, including modems, audio devices, video devices, network interface controller (NICs), universal serial bus (USB) ports, firewire (IEEE 1394) ports, serial ports, parallel ports, etc. Generally, each virtual I/O device may be mapped to a corresponding I/O device in the underlying hardware or may be emulated in software (e.g. the VMM 18) if no corresponding I/O device is included in the underlying hardware.

Specifically, in the embodiment of FIG. 1, there is a virtual NIC 36A through which the application 28 and/or O/S 30 may communicate with other virtual machines and/or other computer systems. For example, when the backup application 50 on the backup server 50 is to communicate with the application 28 in the virtual machine 16A, the backup application 50 may generate a communication to the application 28. The communication may be formatted into one or more packets for transmission on the network 14 to the computer system 10. An identifier in the packet (e.g. the Internet Protocol (IP) address or the MAC address) may be assigned to the virtual NIC 36A and may identify the virtual machine 16A as the destination of the packet.

The virtual machine in which an application is executing encapsulates the application (and its O/S) and encompasses the entire system state associated with the application. Generally, when a virtual machine is active (i.e. the application within the virtual machine is executing on the hardware 20), the virtual machine may be stored in the memory of the computer system on which the virtual machine is executing (although the VMM may support a paging system in which various pages of the memory storing the virtual machine may be paged out to local storage in the computer system) and in the files which are mapped to the virtual storage devices in the virtual machine. The VMM may support a command to suspend the virtual machine. In response to the command, the VMM may write an image of the virtual machine to the storage device 22 (e.g. the images 40 and 42 shown in FIG. 1), capturing the current state of the virtual machine and thus implicitly capturing the current state of the executing application. The image may include one or more files written in response to the suspend command, capturing the state of the virtual machine that was in memory in the computer system, as well as the files representing the virtual storage in the virtual machine. The state may include not only files written by the application, but uncommitted changes to files which may still be in the memory within the virtual machine, the state of the hardware (including the processor is 32, the virtual memory 38, etc.) within the virtual machine, etc. Thus, the image may be a snapshot of the state of the executing application.

The image 40 of the virtual machine 16A is illustrated in greater detail in FIG. 1 for one embodiment. In the illustrated embodiment, the image 40 includes a memory file 70, a disk file 72, and a configuration file 74. The memory file 70 may include the state of the virtual memory 38 in the virtual machine 16A. The configuration file 74 may store information describing the configuration of the CPU. For example, the configuration file 74 may store virtual memory size, number of CPUs 32 and type, I/O device configuration such as NIC configuration for the NIC 36A, number, type, and size of virtual storage devices, etc. Additionally, the configuration file 74 (or another file) may store any virtual hardware state that may be saved (e.g. the state of the virtual CPU 32, etc.). The disk file 72 may be the virtual disk file. A disk file 72 may be provided for each virtual disk or other virtual storage device 34 in the virtual machine. Generally, the disk file stores data that has been written to the virtual storage device. For example, in one embodiment, the file may be arranged by disk block and a given block may be written to its corresponding location in the file according to block number. In another embodiment, the disk file or a related file may map disk blocks to locations in the file. While one disk file 72 is shown in the illustrated embodiment, more than one disk file may represent a virtual storage device 34 in other embodiments.

A suspended virtual machine may be resumed using a resume command supported by the VMM. In response to the resume command, the VMM may read the image of the suspended virtual machine from the storage device and may activate the virtual machine in the computer system.

The backup application 50 is configured to perform a backup of one or more virtual machines 16A-16B. The backup application 50 may use the VMM's snapshot capability to obtain the data to be backed up, by backing up the image 40 or 42 written to the storage device 22 in response to a suspend command. Additionally, the backup application 50 may obtain metadata from the application (or applications) executing within the virtual machine 16A-16B that is being backed-up. In general, the metadata may describe the logical structure of the application data that is being backed up. Accordingly, with the metadata, the backup application 50 may discover the organization of the "raw" data (e.g. in the disk file 72 in the image 40) and thus may provide for granular restores of data from the virtual machine image 40. By describing the logical structure of the data, the metadata may identify logical objects in the backed-up data. The objects may be individually identified in the virtual machine image for retrieval and restoration. The identified objects may be application dependent. For example, if the application is an email server such as Microsoft's Exchange Server, the objects may be individual messages and/or message folders and/or address books. If the application is a database, the objects may be database records and/or database tables. If the application is a file system or directory service, the objects may be files and/or directories.

The backup application 50 may thus support granular restores (i.e. restores of objects that are less than the full virtual machine image). The granular restores may be supported without requiring that backup software be installed in the virtual machine being backed up. Accordingly, user's desires not to install such software may be respected, in some embodiments, while still providing a granular restore capability. In some embodiments, the cost of obtaining licensed copies of a backup application for each virtual machine may be avoided. Additionally, a system administrator or other individual with responsibility for ensuring data integrity may schedule backup policies for each virtual machine, without relying on a user of the virtual machine to establish the policies and without relying on the user to leave the policies alone.

In one embodiment, the backup application 50 may obtain a login account on the virtual machine to be backed up, in order to obtain metadata for the virtual machine. The login account permits remote access to the virtual machine, but does not involve installing software in the virtual machine. That is, the login account permits the remote application (e.g. the backup application 50) to transmit requests to the application 28 in the virtual machine 16A, for example. The requests would be formed into packets that target the virtual NIC 36A, for example, and thus would be communicated to the application 28 within the virtual machine 16A. Accordingly, in general, a request originating outside the virtual machine 16A may be used to obtain the metadata. The request may originate in the backup application 50, which may be executing on a different computer system 12 than the computer system 10 that executes the virtual machine. In other embodiments, the request may originate in a different virtual machine on the computer system 10 (e.g. a virtual machine encapsulating the backup application 50). Accordingly, requests from the backup application 50 to an application in a virtual machine may be characterized as remote requests with respect to the virtual machine and/or the application in the virtual machine.

The backup application may store the metadata from a virtual machine and its virtual machine image (e.g. on a storage medium 60 in the backup server 12 or coupled to the backup server 12). The backup for the virtual machine thus comprises at least the virtual machine image and the metadata obtained by the backup application 50. For example, in FIG. 1, a copy of the VM image 40 for the virtual machine 16A (backup image 52) and corresponding metadata 54 are included in the backup of the virtual machine 16A. Similarly, a copy of the VM image 42 for the virtual machine 16B (backup image 56) and corresponding metadata 58 are included in the backup of the virtual machine 16B. If the application in the virtual machine 16B is different from the application 28 in the virtual machine 16A, the metadata 58 differs from the metadata 54. Additionally, even if the application in the virtual machine 16B is the same as the application 28, the metadata 58 may differ from the metadata 54 because the application data in the images 52 and 56 may differ.

In one embodiment, the backup application 50 may perform storage mapping on the virtual machine backup image using the metadata to identify the objects in the backup image. Generally, storage mapping may refer to determining the logical organization of data, down to the storage locations on a storage device (e.g. disk blocks on a disk). That is, the process of storage mapping may include interpreting the metadata obtained from the application to locate the data that corresponds to a given object on the storage device. In the case of a virtual machine, the storage mapping may involve mapping down to the blocks of storage on the virtual storage device(s) 34. In this fashion, the identified objects may be retrieved from the image. In one embodiment, a catalog of the objects and corresponding storage locations may be generated by the backup application 50 and stored as part of the backup of the corresponding virtual machine. Thus, the embodiment illustrated in FIG. 1 includes a catalog 62 as part of the backup for the virtual machine 16A and the catalog 64 as part of the backup for the virtual machine 16B.

In the embodiment of FIG. 1, the storage medium 60 may be used to store the backups of the virtual machines 16A-16B. Generally, the storage medium 60 may be any medium capable of storing data. For example, the storage medium 60 may be storage device similar to the storage device 22. The storage medium 60 may be a removable storage device, to allow the storage medium 60 to be physically separated from the backup server 12 after the backup is complete. Storing the storage medium 60 physically separated from the backup server 12 may increase the reliability of the backup, since an event which causes problems on the backup server 12 may not affect the storage medium 60. For example, the storage medium 60 may comprise a removable disk or disk drive, a tape backup, writeable compact disk storage, etc. Alternatively, the storage medium 60 may comprise another computer system coupled to receive the backup data from the backup server 12 (e.g. via a network coupling the two computer systems), a storage device attached to a network to which the backup server is attached (e.g. NAS or SAN technologies), etc.

The virtual hardware in the virtual machine 16A (and other virtual machines such as the virtual machines 16B-16C) may be similar to the hardware 20 included in the computer system 10. For example, the virtual CPU 32 may implement the same instruction set architecture as the processor(s) in the hardware 20. In such cases, the virtual CPU 32 may be one or more data structures storing the processor state for the virtual machine 16A. The application and O/S software instructions may execute on the CPU(s) in the hardware 20 when the virtual machine 16A is scheduled for execution by the VMM 18. When the VMM 18 schedules the virtual machine 16A for execution, the VMM 18 may load the virtual CPU state 32 into the hardware CPU. Similarly, when the VMM 18 stops the virtual machine 16A to schedule another virtual machine for execution (e.g. the virtual machine 16B), the VMM 18 may write the state of the processor into the virtual CPU 32 data structure. Alternatively, the virtual CPU 32 may be different from the CPU(s) in the hardware 20. For example, the virtual CPU 32 may comprise software coded using instructions from the instruction set supported by the underlying CPU to emulate instruction execution according to the instruction set architecture of the virtual CPU 32. Alternatively, the VMM 18 may emulate the operation of the hardware in the virtual machine. Similarly, any virtual hardware in a virtual machine may be emulated in software if there is no matching hardware in the hardware 20.

Different virtual machines which execute on the same computer system 10 may differ. For example, the O/S 30 included in each virtual machine may differ. Different virtual machines may employ different versions of the same O/S (e.g. Microsoft Windows NT with different service packs installed), different versions of the same O/S family (e.g. Microsoft Windows NT and Microsoft Windows2000), or different O/Ss (e.g. Microsoft Windows NT, Linux, Sun Solaris, etc.).

Generally, the VMM 18 may be responsible for managing the virtual machines on a given computer system. The VMM 18 may schedule virtual machines for execution on the underlying hardware, using any scheduling scheme. For example, a time division multiplexed scheme may be used to assign time slots to each virtual machine. Additionally, the VMM 18 may handle the suspending and resuming of virtual machines responsive to suspend and resume commands. The commands may be received from a virtual machine, or may be communicated from another computer system. In one embodiment, the VMM may be the ESX product available from VMware, Inc. (Palo Alto, Calif.). Other embodiments may include the Xen virtual machine monitor available as freeware, virtual machine monitors available from Microsoft, Inc., etc.

In the illustrated embodiment, the VMM may execute directly on the underlying hardware (i.e. without an underlying operating system). In other embodiments, the VMM may be designed to execute within an operating system. For example, the GSX product available from VMware, Inc. may execute under various versions of Microsoft's Windows operating system and/or the Linux operating system.

The storage device 22 may be any type of storage device to which the computer system 10 may be coupled. For example, the storage device 22 may comprise one or more fixed disk drives such as integrated drive electronics (IDE) drives, small computer system interface (SCSI) drives, etc. The fixed disk drives may be incorporated as peripherals of the computer system 10 through a peripheral bus in the computer system 10 such as the peripheral component interconnect (PCI) bus, USB, firewire, etc. Alternatively, the storage device 22 may couple to a network (e.g. network attached storage (NAS) or storage area network (SAN) technologies may be used). The storage device 22 may be included in file servers to which the computer system 10 has access. The storage device 22 may also be removable disk drives, memory, etc. Generally, a storage device is any device which is capable of storing data.

It is noted that, while each virtual machine illustrated in FIG. 1 includes one application, generally a virtual machine may include one or more applications. For example, in one embodiment a user may execute all applications which execute on the same underlying O/S 30 in the same virtual machine.

It is noted that the term "program", as used herein, refers to a set of instructions which, when executed, perform the function described for that program. The instructions may be machine level instructions executed by a CPU, or may be higher level instructions defined in a given higher level language (e.g. shell scripts, interpretive languages, etc.). The term "software" may be synonymous with "program".

Figure 2:
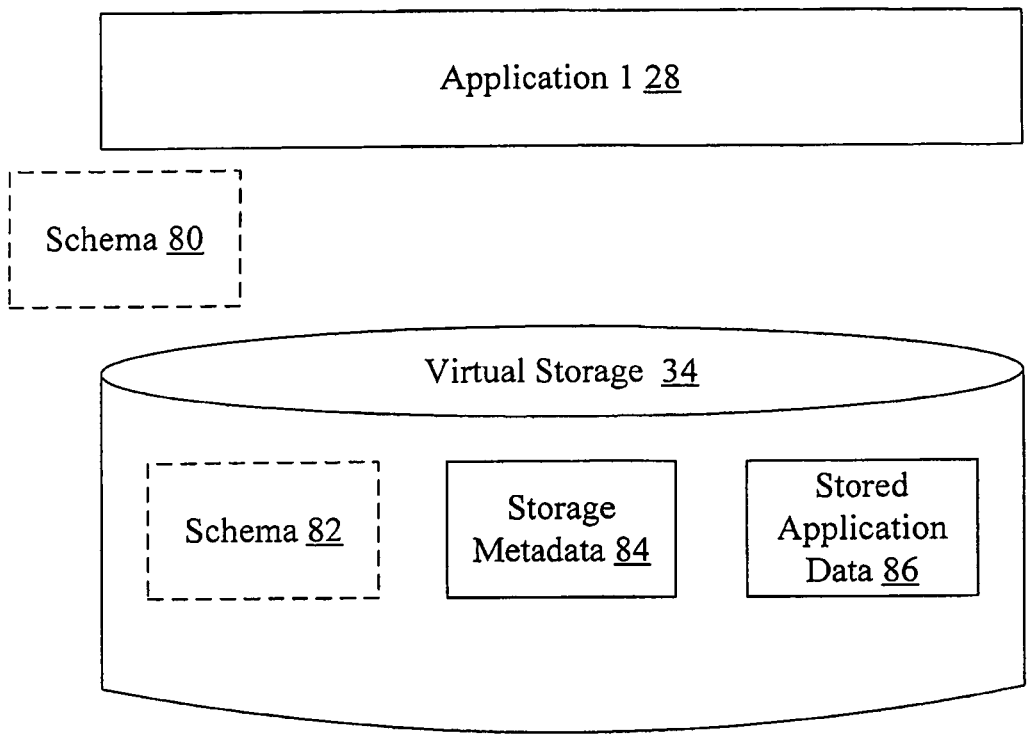
FIG. 2 is a block diagram illustrating an application and a virtual storage device that may be included in a virtual machine.

Turning now to FIG. 2, a block diagram of one embodiment of the application 28 and its virtual storage device 34 are shown in greater detail. The application 28 may employ one or more schema such as schema 80 and/or schema 82 to organize data to be stored on the virtual storage device 34. The schema 80/82 may be application dependent. For example, a database application may implement a schema for storing data in database tables on the virtual storage device 34. The database schema may supercede a filesystem that may be implemented on the storage device. An email server may similarly include a schema for storing messages and message folders on the virtual storage device 34. In some embodiments, the schema may be expressed in an application-dependent syntax. In other embodiments, the schema may be defined in a markup language such as the extensible markup language (XML).

The schema 82 on the virtual storage device 34 may represent a file or files that may be stored by the application 28 and which may describe the logical structure of the application's data. Schema 80 may represent a schema stored in memory and/or a schema that is implicit in the coding of the application 28. The application 28 may provide the schema 80 when requested (e.g. by the backup application 80), but may not explicitly store the schema 80 in complete form.

FIG. 2 also illustrate storage metadata 84 and the corresponding stored data 86. The storage metadata 84 may comprise data created by a filesystem or directory service, for example. In some embodiments, the storage metadata 84 may be the metadata supplied to the backup application 50. Alternatively, the storage metadata 84 may be part of the metadata, along with one or more schemas 80/82. In other embodiments, the storage metadata 84 may not be included in the metadata supplied to the backup application 50.

Figure 3:
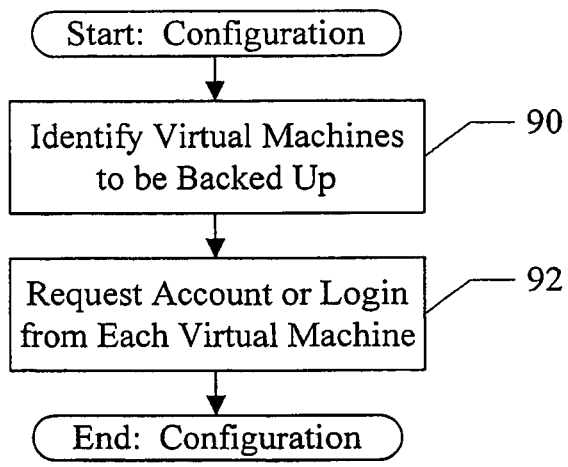
FIG. 3 is a flowchart illustrating operation of one embodiment of a backup application during configuration to backup a virtual machine.

Turning next to FIG. 3, a flowchart is shown illustrating operation of one embodiment of the backup application 50 during configuration of the backup application 50. While the blocks are shown in a particular order, other orders may be used. The backup application 50 comprises instructions which, when executed, implement the operation illustrated in FIG. 3.

The backup application 50 may be configured when it is installed on the backup server 12, or may be configured whenever additional virtual machines are to be backed up by the backup application 50. Configuration may further include other steps, as desired. For example, configuration may include providing a backup policy for each virtual machine, identifying storage media to be used for backup, etc.

The backup application 50 may be programmed with information identifying the virtual machines to be backed up (block 90). The identification may include an identifier (e.g. a virtual machine name) of each virtual machine that can be used, e.g. by the VMM 18 to identify the specific virtual machine. The identification may further include an IP address assigned to the virtual machine, the IP address and/or hostname of the computer system 10 on which the virtual machine executes, etc.

The backup application 50 (and/or a user or administrator performing the configuration) may request an account or other login from each virtual machine (and/or from the application executing in the virtual machine, as appropriate) (block 92). The account/login may permit the remote backup application 50 to remotely request the metadata for identifying objects within the virtual machine.

Figure 4:
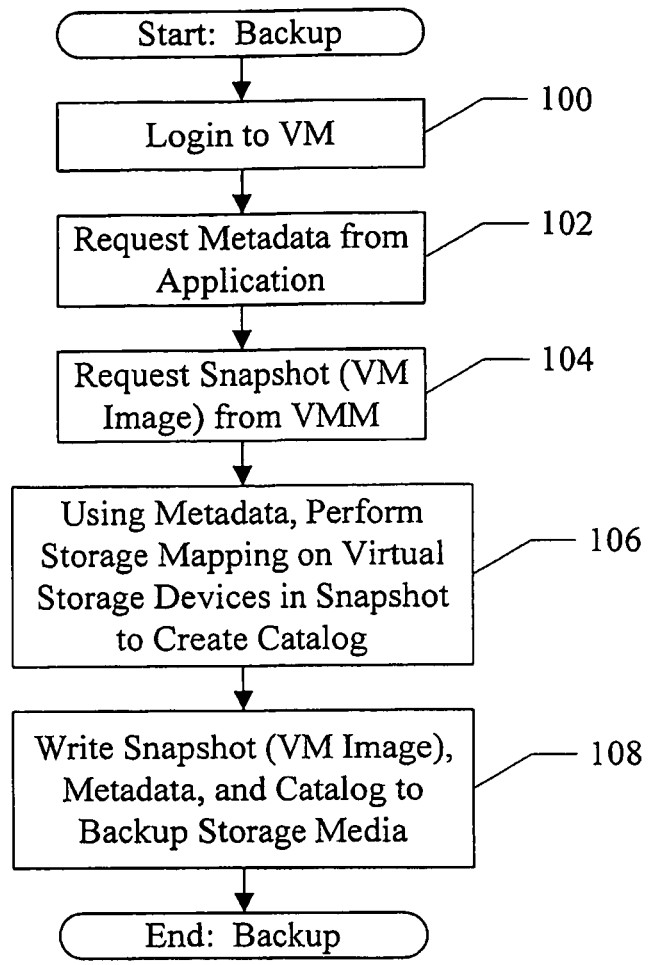
FIG. 4 is a flowchart illustrating operation of one embodiment of the backup application during a backup of a virtual machine.

Turning now to FIG. 4, a flowchart is shown illustrating operation of one embodiment of the backup application 50 to perform a backup of a virtual machine. While the blocks are shown in a particular order, other orders may be used. The backup application 50 comprises instructions which, when executed, implement the operation illustrated in FIG. 4.

The backup application 50 may use the login account that was provided during configuration to login to the virtual machine/application (block 100). Other applications may include an application program interface (API) or other mechanism to permit a metadata request. In such cases, block 100 may be eliminated. The backup application 50 may request the metadata describing the structure of the application's data (block 102). The metadata may be requested at the time of backup because the structure of the data may change as data is generated by the application. For example, an email server may include additional folders; a filesystem's directory structure may be changed; or a database's schema may be changed. The backup application 50 may request a snapshot from the VMM 18 (block 104). The VMM 18 may respond to the snapshot request by suspending the virtual machine. If the virtual machine is suspended to a storage device that is accessible to the backup server 12, the backup application 50 may copy the virtual machine image (snapshot) from the storage device. Alternatively, the VMM 18 may transmit the virtual machine image to the backup server 12. The VMM 18 may resume the virtual machine subsequent to making the snapshot.

The backup application 50 may use the metadata to perform storage mapping on the virtual machine, identifying the location or locations of various objects on the virtual storage devices 34 in the virtual machine (block 106). The backup application may create the catalog as a result of the mapping the objects to the virtual storage device(s).

The backup application 50 may write the virtual machine image, the metadata, and the catalog to the backup storage medium 60 (block 108). It is noted that, while block 108 is shown at the end of the backup process, the image, metadata, and catalog may be written as each is received. It is further noted that, in some embodiments, the catalog and metadata may be merged into a single file/data object for storage on the backup storage medium 60.

Figure 5:
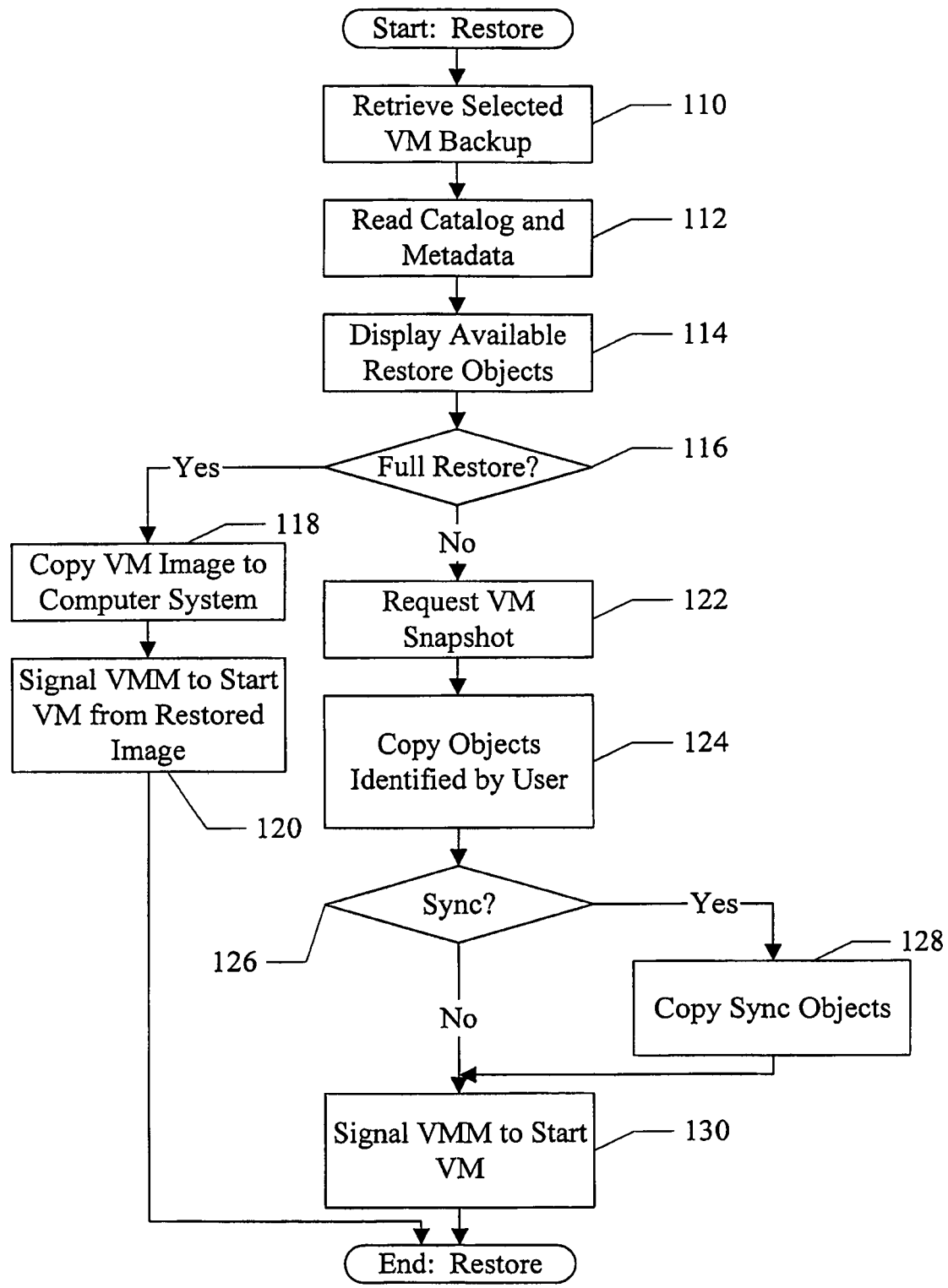
FIG. 5 is a flowchart illustrating operation of one embodiment of the backup application during a restore from a backup of a virtual machine.

Turning now to FIG. 5, a flowchart is shown illustrating operation of one embodiment of the backup application 50 to perform a restore for a virtual machine. While the blocks are shown in a particular order, other orders may be used. The backup application 50 comprises instructions which, when executed, implement the operation illustrated in FIG. 5.

The user (e.g. a system administrator, or a user of the backed-up virtual machine) may identify the virtual machine for which backup is requested (e.g. by virtual machine name or other identifier). The backup application 50 may retrieve the backup of the identified virtual machine (block 110). The backup may include the virtual machine image, the metadata, and the catalog, for example. The backup application 50 may read the metadata and/or catalog (block 112), identifying objects in the backup image. The backup application 50 may display the available objects that can be restored individually (block 114). For example, the backup application 50 may provide a graphical user interface such as a browser to permit the user to view the available objects.

In some cases, the user may choose to restore the entire virtual machine image (decision block 116). If a full restore is desired (decision block 116, "yes" leg), the backup application 50 may copy the backup image to the computer system 10 (block 118). Alternatively, the user may identify another computer system to which the full restore is to be performed, and the backup application 50 may copy the backup image to the identified computer system. The backup application 50 may signal the VMM 18 to start the virtual machine from the restored image (block 120).

In other cases, the user may choose to restore only selected objects (decision block 116, "no" leg). That is, the user may provide input identifying selected objects to restore, where the input excludes at least one object within the backup image. The user input may be provided manually (e.g. using various user interface devices such as a keyboard, a mouse, etc.). Alternatively, the user input may be provided in the form of a file that lists the objects to be restored, or a shell script or other executable form. The user input may be provided remotely (e.g. a user from the virtual machine may transmit a request to the backup server 12 identifying the objects to be restored).

The backup application 50 may request a snapshot (virtual machine image) of the virtual machine to which the restore is to be performed from the VMM 18 that controls the virtual machine (block 122). In some embodiments, the backup application 50 may also login to the virtual machine and request the current metadata (or otherwise request the current metadata, depending on the mechanism used to collect the metadata) and may perform storage mapping on the snapshot. Whether or not current metadata and storage mapping is performed is application dependent. For example, a filesystem or directory service application may require current metadata and storage mapping. A database may not (as the recovered database entries may be written to the database using commands executed by the database after the virtual machine is restarted).

The backup application 50 may copy the objects identified by the user from the backup image (block 124). That is, based on the stored metadata and catalog, the backup application 50 may extract the identified objects from the backup image. The backup application 50 may copy the selected objects to a temporary location (from which they may be restored into the virtual machine) or may be copied directly into the virtual machine image, in various embodiments. In some cases, additional objects may be required to synchronize the restored objects to the current virtual machine image (decision block 126) to provide a consistent state for the application. For example, if a file that had been deleted from a filesystem is restored, the directory into which the file is restored may be updated to indicate the existence of the file. If a database record is restored, other records that were updated in the same transaction may need to be restored. If a message is restored to an email server, the inbox or other folder containing the restored message may be updated.

If additional objects are identified that are to be restored to synchronize the application to a consistent state (decision block 126, "yes" leg), the backup application 50 may copy the additional objects (block 128). That is, the backup application 50 may extract the additional objects from the backup image. Again, the additional objects may be copied to a temporary storage area, or directly into the current virtual machine image, as desired. In either case, the backup application may signal the VMM 18 to start the virtual machine (e.g. from the modified virtual machine image, in some embodiments) (block 130).

Figure 6:
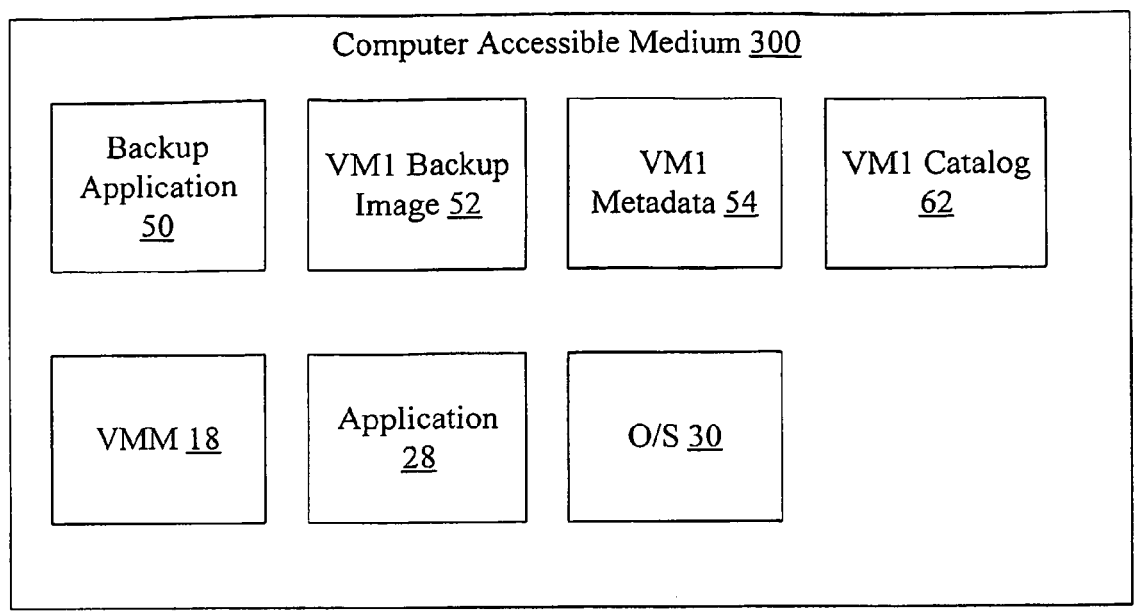
FIG. 6 is a block diagram of one embodiment of a computer accessible medium.

Turning now to FIG. 6, a block diagram of a computer accessible storage medium 300 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link. The computer accessible medium 300 in FIG. 6 may store one or more of the backup application 50, the backup virtual machine image 52, the metadata 54, the catalog 62 (and/or the corresponding backup virtual machine image, metadata, and catalog for one or more other virtual machines), the VMM 18, the application 28 (and/or other applications in other virtual machines), and/or the O/S 30 (and/or other O/Ss in other virtual machines). The backup application 50 may implement one or more of the flowcharts shown in FIGS. 3-5. Generally, the computer accessible storage medium 300 may store any set of instructions which, when executed, implement a portion or all of the flowcharts shown in FIGS. 3-5. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A computer-implemented method comprising:
   requesting metadata from an application executing on a virtual machine using a backup application, the backup application communicating with the virtual machine and the backup application being remote to the virtual machine, wherein the virtual machine is executing on hardware in a computer system, and wherein the virtual machine includes an operating system that controls execution of the application within the virtual machine, and wherein the computer system includes a virtual machine monitor executed on the computer system to control execution of the virtual machine on the computer system, and wherein the request originates external to the virtual machine, and wherein the request is transmitted to the virtual machine as one or more packets targeting a virtual network interface controller (NIC) within the virtual machine, and wherein the metadata describes a logical structure of application data stored on one or more virtual storage devices in the virtual machine and wherein the metadata identifies logical data objects within the application data stored on the one or more virtual storage devices in the virtual machine, wherein requesting the metadata comprises remotely logging into an account on the virtual machine to transmit the request for the metadata;
   requesting a first image of the virtual machine from the virtual machine monitor that controls the virtual machine using the virtual machine monitor's suspend command which generates a snapshot image of the virtual machine, wherein the virtual machine monitor is executing on the hardware in the computer, and wherein the first image includes one or more files representing the one or more virtual storage devices;
   performing storage mapping on the one or more virtual storage devices using the metadata to create a catalog of data objects in the logical structure and locations of the data objects on the one or more virtual storage devices; and
   storing the metadata and the first image as a backup of the virtual machine, wherein the metadata is stored separately from the first image.

2. The method as recited in claim 1 further comprising storing the catalog as part of the backup of the virtual machine.

3. The method as recited in claim 1 further comprising:
   presenting data objects stored on the one or more virtual storage devices to a user in response to a restore request;
   accepting user input identifying one or more data objects to restore, the user input excluding at least one data object that is stored on the one or more virtual storage devices;
   extracting the identified data objects from the first image of the virtual machine responsive to the user input identifying the identified data objects; and
   restoring the identified data objects from the first image to a second image of the virtual machine that is different from the first image.

4. The method as recited in claim 3 further comprising requesting the second image from the virtual machine manager.

5. The method as recited in claim 3 wherein the restoring comprises modifying the second image to store the identified objects on the one or more virtual storage devices.

6. The method as recited in claim 5 further comprising:
   detecting one or more additional data objects to be restored to synchronize the second image to a consistent state;
   extracting the additional data objects from the first image of the virtual machine; and
   restoring the additional data objects to the second image of the virtual machine.

7. The method as recited in claim 3 further comprising signalling the virtual machine manager to start the virtual machine from the second image.

8. A non-transitory computer accessible storage medium storing a plurality of instructions including instructions executed on a backup server during use, the instructions executing on the backup server including a backup application, wherein the backup server is separate from a computer system that executes a virtual machine during use, the backup application communicating with a virtual machine that is remote to the backup application during use, wherein the virtual machine includes an application, the instructions executed on the backup server during use to:
   request metadata by the backup application from the application, wherein the virtual machine includes an operating system that controls execution of the application within the virtual machine, and wherein the computer system includes a virtual machine monitor executed on the computer system during use to control execution of the virtual machine on the computer system, and wherein the request is transmitted to the virtual machine as one or more packets targeting a virtual network interface controller (NIC) within the virtual machine, and wherein the metadata describes a logical structure of the application data stored on one or more virtual storage devices in the virtual machine, and wherein the metadata identifies logical data objects within the application data, wherein requesting the metadata comprises remotely logging into an account on the virtual machine to transmit the request for the metadata;
   request a first image of the virtual machine from the virtual machine monitor that controls the virtual machine using the virtual machine monitor's suspend command which generates a snapshot image of the virtual machine, wherein the first image includes one or more files representing the one or more virtual storage devices;
   perform storage mapping on the one or more virtual storage devices using the metadata to create a catalog of data objects in the logical structure and locations of the data objects on the one or more virtual storage devices; and
   store the metadata and the first image as a backup of the virtual machine, wherein the metadata is stored separately from the first image.

9. The non-transitory computer accessible storage medium as recited in claim 8 wherein the instructions are executed during use to store the catalog as part of the backup of the virtual machine.

10. The non-transitory computer accessible storage medium as recited in claim 8 wherein the instructions are executed during use to:
    present data objects stored on the one or more virtual storage devices to a user in response to a restore request;
    accept user input identifying one or more data objects to restore, the user input excluding at least one data object that is stored on the one or more virtual storage devices;
    extract the identified data objects from the first image of the virtual machine responsive to the user input identifying the identified data objects; and restore the identified data objects from the first image to a second image of the virtual machine that is different from the first image.

11. The non-transitory computer accessible storage medium as recited in claim 10 wherein the instructions are executed during use to:
detect one or more additional data objects to be restored to synchronize the second image to a consistent state;
extract the additional data objects from the first image of the virtual machine; and
restore the additional data objects to the second image of the virtual machine.

12. A system comprising:
a computer system comprising hardware that is configured to execute at least one virtual machine, wherein the virtual machine comprises an application and one or more virtual storage devices; and
a backup server computer system coupled to the computer system and configured to backup data describing the virtual machine using a backup application, the backup application communicating with the application on the virtual machine during use, wherein the virtual machine is remote to the backup application, wherein the backup server computer system is configured to restore selected data objects from a first virtual storage device in a backup image to the virtual machine while excluding other data objects on the first virtual storage device, and wherein the backup server computer system is configured to perform the restore of the selected data objects without installing backup software within the virtual machine responsive to metadata corresponding to the backup image that is stored by the backup server separate from the backup image, and wherein the metadata is requested from an application executing on the virtual machine during generation of the backup image, wherein requesting the metadata comprises remotely logging into an account on the virtual machine to transmit the request for the metadata during use, and wherein the virtual machine includes an operating system that controls execution of the application within the virtual machine, and wherein the computer system includes a virtual machine monitor that controls execution of the virtual machine on the computer system, wherein the backup application uses the virtual machine monitor's suspend command which generates a snapshot image of the virtual machine, and wherein the request is transmitted to the virtual machine as one or more packets targeting a virtual network interface controller (NIC) within the virtual machine, wherein the backup server computer system is further configured to perform storage mapping on the one or more virtual storage devices using the metadata to create a catalog of data objects in the logical structure and locations of the data objects on the one or more virtual storage devices.

13. The system as recited in claim 12 wherein metadata describes a logical structure of data on the one or more virtual storage devices, and wherein the backup server computer system is configured to store the first image and the metadata as a backup of the virtual machine.

14. The system as recited in claim 13 wherein the backup server computer system is further configured to store the catalog as part of the backup of the virtual machine.

15. The system as recited in claim 12 wherein the backup server computer system is further configured to present data objects stored on the one or more virtual storage devices to a user in response to a restore request; accept user input identifying one or more data objects to restore, the user input excluding at least one data object that is stored on the one or more virtual storage devices; extract the identified data objects from the first image of the virtual machine responsive to the user input identifying the identified data objects; and restore the identified data objects from the first image to a second image of the virtual machine that is different from the first image.

16. The system as recited in claim 15 wherein the backup server computer system is further configured to detect one or more additional data objects to be restored to synchronize the second image to a consistent state; extract the additional data objects from the first image of the virtual machine; and restore the additional data objects to the second image of the virtual machine.

* * * * *